United States Patent [19]

Linck

[11] Patent Number: 5,310,111
[45] Date of Patent: May 10, 1994

[54] PNEUMATIC CONTROLLER
[75] Inventor: Keith S. Linck, Austin, Tex.
[73] Assignee: Johnson Service Company, Milwaukee, Wis.
[21] Appl. No.: 33,838
[22] Filed: Mar. 19, 1993
[51] Int. Cl.[5] .............................................. F24F 7/06
[52] U.S. Cl. ..................... 236/49.4; 137/85; 236/82; 255/29
[58] Field of Search .......... 236/49.4, 84, 82; 137/85; 251/29

[56] References Cited

U.S. PATENT DOCUMENTS

| | | | |
|---|---|---|---|
| 2,490,420 | 12/1949 | Davis | 236/84 X |
| 3,300,174 | 1/1967 | Urban et al. | 251/29 |
| 3,602,241 | 8/1971 | Puster | 236/82 X |
| 3,809,314 | 5/1974 | Eugelke et al. | 236/49.4 |
| 3,810,578 | 5/1974 | Matthews | 236/84 X |
| 4,042,173 | 8/1977 | Boyer et al. | 236/49.4 |
| 5,114,070 | 5/1992 | Lilya et al. | 236/49.3 |
| 5,158,230 | 10/1992 | Curran | 236/49.4 |

Primary Examiner—William E. Tapolcai
Attorney, Agent, or Firm—Foley & Lardner

[57] ABSTRACT

A pneumatic controller configured to regulate the opening and closing of a controlled device in response to a measured variable, such as temperature. The pneumatic controller includes a sensor providing an output proportional to the measured variable as well as a gas supply inlet and a gas outlet. A pneumatic relay is disposed between the inlet and the outlet for regulating the pressure of gas passing through the inlet to the outlet to the controlled device. A pneumatic actuator system is connected to the relay and regulates the relay via cooperation between an inflatable bladder and a pneumatic pilot circuit in the relay. The pneumatic actuator system includes a first electric microvalve which selectively permits passage of a gas into the inflatable bladder and a second electric microvalve which selectively permits passage of a gas out of the inflatable bladder in response to a digital controller connected to the sensor.

21 Claims, 3 Drawing Sheets

PNEUMATIC CONTROLLER

FIELD OF THE INVENTION

The present invention relates generally to pneumatic controllers which regulate the environment within a controlled space.

BACKGROUND OF THE INVENTION

Pneumatic controllers, such as thermostats, are connected between a sensing element located in a regulated space and a controlled device operable to change the conditions of the space (e.g. HVAC systems and components). The sensor is sensitive to changes in the controlled space and able to consistently provide an output signal proportional to the level of a controlled variable, e.g. temperature or humidity. In response to the output signal, the controller actuates the controlled device to prevent excessive deviation of the variable from the desired setpoint. Generally, there are two main elements in a controller, a sensing element and a relay which produces an output in response to the sensing element to actuate the controlled device. The controlled device may take a variety of forms including, for instance, a valve or damper for admitting warm air into a room.

Often with heating, ventilating, and air conditioning systems, pneumatic controllers are used to provide a controlled pressure output which regulates the position of the controlled device. For example, a typical pneumatic system includes a compressor for supplying a pressurized source of air, typically at 15 or 20 PSIG. This supply air is delivered through conduits to a pneumatic relay having a valve for selectively permitting passage of the supply air through the relay to the controlled device. The valve is typically a diaphragm type valve whose position is controlled by the pressure level in a pilot circuit. The pilot circuit is a passage which allows a portion of the supply air to pass along one side of the diaphragm before exiting through a control port. The amount of resistance to air passing from the control port controls the pressure build-up within the pilot circuit and thus the position of the control valve.

A sensor, such as a bi-metal element, is disposed in proximity to the control port to change the amount of resistance relative to the level of the controlled variable. For instance, when the controlled variable, e.g. temperature, is at an equilibrium level with the setpoint, the bi-metal element will be at an equilibrium position. However, if the temperature deviates from the setpoint in one direction, the bi-metal element will bend away from the control port allowing free passage of supply air. On the other hand, as the temperature moves beyond the setpoint in the opposite direction, the bi-metal element will bend towards the control port tending to further restrict passage of air from the control port as the temperature change continues. This will of course change the pressure in the pilot chamber which, in turn, changes the position of the control valve to thereby increase or decrease the airflow and pressure to the controlled device as required in a particular application.

Although pneumatic control systems like the one described above work well in certain applications, other applications present greater difficulties. One difficulty is that use of a bi-metal element to sense a given variable and then control the pneumatic relay is often less precise than desired. For example, the bi-metal element may not react consistently to temperature change or it may react too slowly. This type of system makes it more difficult to maintain the temperature, for instance, of a room within a close range from the setpoint.

In other systems, digital controllers have been used to control the flow of air to the controlled device. For example, in Lilja et al., U.S. Pat. No. 5,114,070, a pneumatic thermostat is disclosed which uses an electronic to pneumatic transducer controlled by a microprocessor. This, of course, presents further obstacles because either electric wires must be run to the microprocessor to provide power or a remote power supply must be used. In Lilja, the use of a battery, solar cell, or air turbine is suggested to supply or supplement electric power to the microprocessor. One problem with this system is that when the battery goes dead the control system is no longer powered. Similarly, if there is an insufficient light or air supply to run the solar cell or air turbine, the pneumatic thermostat will not function.

The electronic to pneumatic transducer disclosed in Lilja uses a pair of solenoids to allow passage of air between the inlet pipe and the outlet pipe of the transducer or between the outlet pipe and atmosphere respectively. The solenoid valves are controlled by the microprocessor. This system requires solenoids capable of regulating the substantial air volume and air pressure in the main air supply conduit. Manipulating such solenoid valves requires a relatively large amount of power from the power source which increases the rate at which the power source is depleted. It would be advantageous to have a digitally controlled system that did not operate directly in the main air supply conduits and thus did not require such a substantial amount of energy.

SUMMARY OF THE INVENTION

The present invention features a pneumatic controller comprising a sensor producing an electric signal representative of a given variable such as temperature. The pneumatic controller also includes a gas supply inlet, a gas outlet, and a pneumatic relay coupled between the inlet and the outlet to regulate the flow of gas passing between the inlet and outlet. A pneumatic actuator is coupled to the pneumatic relay to actuate the pneumatic relay, and a control system is coupled between the sensor and the pneumatic actuator. The control system controls the pneumatic actuator in response to the electric signal such that the pneumatic relay appropriately regulates the flow of gas.

DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
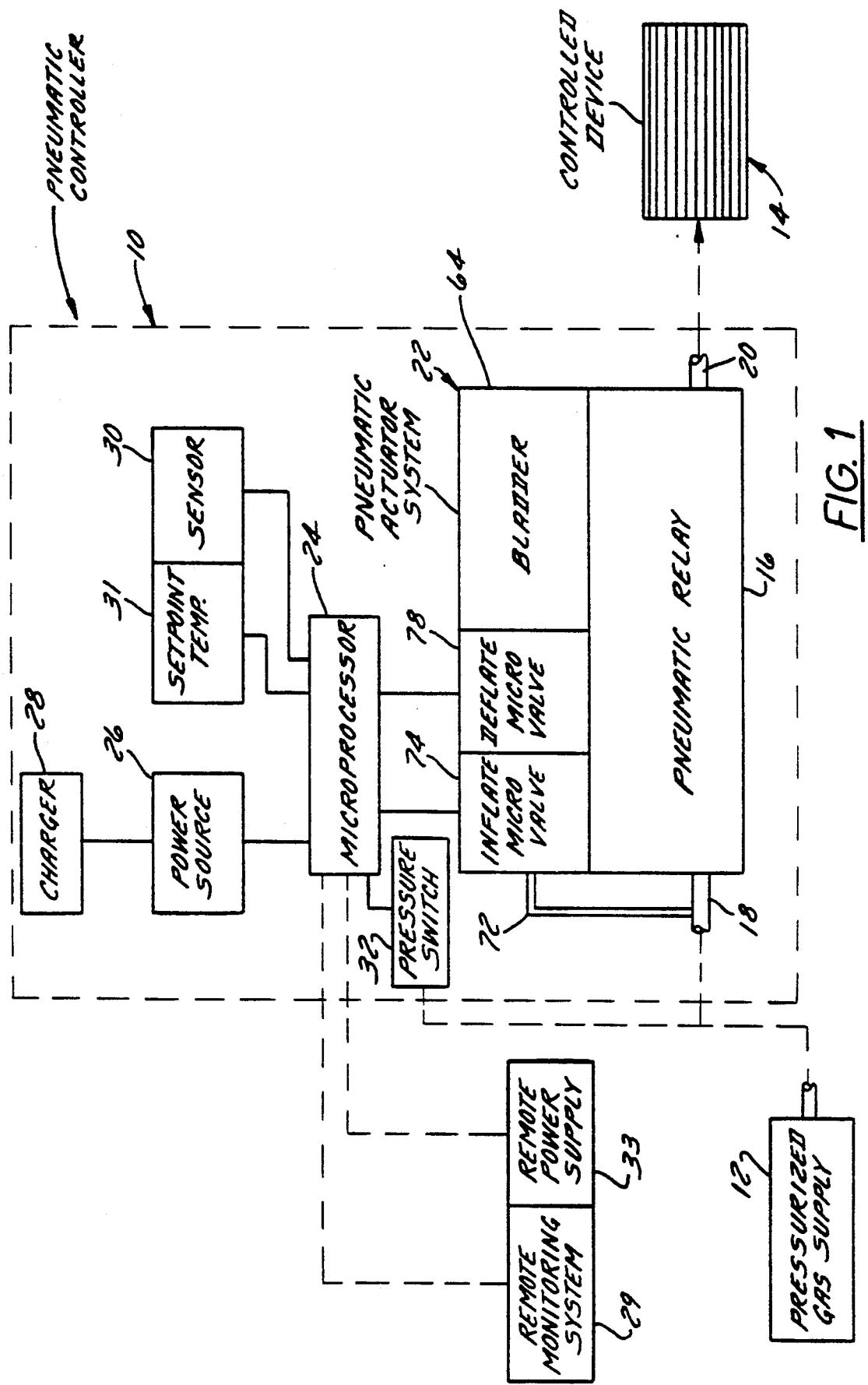
FIG. 1 is a schematic representation of the pneumatic controller according to the present invention.

Referring generally to FIG. 1, a pneumatic controller 10 is connected between a pressurized gas supply 12 and a controlled device 14. These three components are the basic components in a component of an HVAC system such as a pneumatic control system, and usually the pressurized gas supply is an air compressor and the controlled device is a damper or valve. Such systems are most common for heating, ventilating, and air conditioning control in buildings. Pneumatic controller 10 is typically a thermostat for sensing and controlling the temperature in a defined space; however, pneumatic controller 10 could also be used to control humidity or any number of other controllable variables.

Pneumatic controller 10 includes a pneumatic relay 16 having a gas supply inlet 18 and a gas outlet 20. Gas supply 12 provides pressurized gas, such as air, to gas supply inlet 18 at a generally constant pressure, typically selected between 13 and 25 psi. Pneumatic relay 16 controls the amount of gas flow and the pressure at gas outlet 20 which regulates the opening and closing of controlled device 14. Also, pneumatic controller 10 may be a two-position controller permitting either zero pressure or full pressure to act on controlled device 14, or a proportional controller which allows pressures ranging from zero to full line pressure to act on controlled device 14. With the proportional controller, controlled device 14 can be opened to different degrees as opposed to either fully opened or fully closed.

One example of how the pneumatic controller system works is as follows. Controlled device 14 is a damper that can be closed or opened to allow warm air to flow into a room. Pneumatic relay 16 is configured to permit a greater amount of pressure at gas outlet 20 when more heat is required in the room. Thus, the increased pressure at gas outlet 20 would act on controlled device 14 to further open the damper, allowing a greater amount of warm air to flow into the room.

Pneumatic relay 16 is controlled by a pneumatic actuator system 22 which uses gas pressure, preferably from pressurized gas supply 12, to precisely actuate pneumatic relay 16. In turn, the pneumatic actuator system 22 is controlled by a controller 24, which in the preferred embodiment is a digital controller, such as a microprocessor. However, controller 24 could be an analog controller such as a comparator based circuit for comparing a setpoint signal such as that produced by a potentiometer, with the signal produced by a sensor such as a temperature sensor. Digital controller 24 is powered by an internal power source 26, e.g. a rechargeable battery. A battery charger 28 is also connected to battery 26 to maintain the battery at sufficient power levels to run the digital controller and pneumatic actuator system. Preferably, charger 28 is a solar cell or a series of electrically connected solar cells, but it could also be an air turbine in fluid communication with pressurized gas supply 12 at gas supply inlet 18 or somewhere between gas supply inlet 18 and pressurized gas supply 12. The turbine would be powered by pressurized gas escaping therethrough. Optionally, digital controller 24 could be connected to and monitored by a remote monitoring system 29, such as a computer controller. The remote monitoring system 29 cold be connected to a number of pneumatic controllers 10 to monitor the temperatures and change the set points in various controlled environments. Remote monitoring system 29 could also incorporate a remote power supply 33 to provide power to pneumatic controller 10 to either directly power digital controller 24 or to recharge battery 26.

A sensor 30 is also connected to digital controller 24 and is disposed to sense a variable in the space in which that variable is to be controlled. For instance, if the temperature of a room is being controlled, sensor 30 is configured to sense the temperature of the room and provide an output signal, proportional to the temperature, to digital controller 24. Digital controller 24 then compares the sensor output signal with the setpoint temperature established by a setpoint device 31. By way of example, device 31 could be a memory or digital switch which is configured to store a digital value representative of the desired setpoint. If the output signal is not within an equilibrium range from the setpoint temperature, the pneumatic actuator system 22 actuates pneumatic relay 16 so the appropriate gas pressure will act on controlled device 14 to increase or decrease the warm air entering the controlled space. For example, if the setpoint of the digital controller 24 is set at 75° and the temperature in the room sensed by sensor 30 is 72°, the control algorithm of digital controller 24 will determine whether this deviation is acceptable. If not, digital controller 24, in cooperation with pneumatic actuator system 22, will regulate pneumatic relay 16 so controlled device 14 will permit additional warm air to flow into the room.

A pressure-to-electric switch 32 is also connected to digital controller 24. Switch 32 is placed in communication with the pressurized gas flowing to gas supply inlet 18. If the pressure at gas supply inlet 18 falls to or near 0 psi, this usually represents a large scale problem with the pressurized gas supply, such as a power outage, which would render pneumatic controller 10 inoperable. In this situation, pressure-to-electric switch 32 shuts off digital controller 24 to conserve the stored energy in power source 26.

Figure 2:
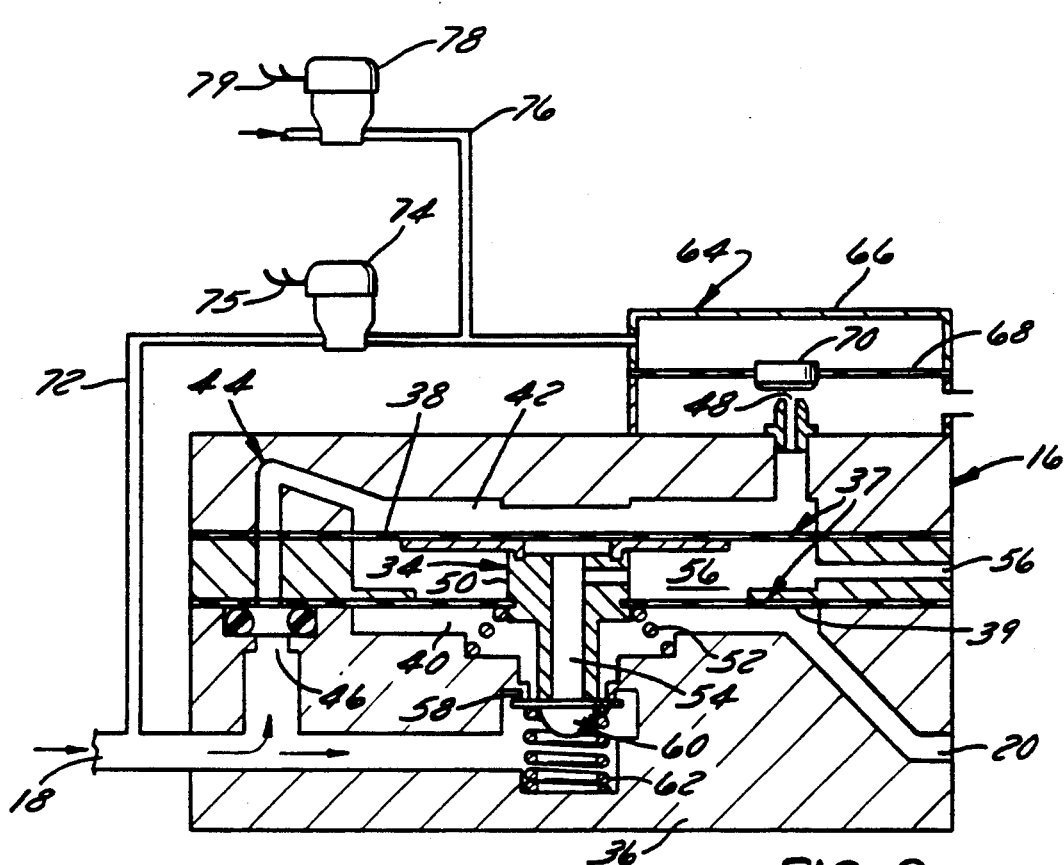
FIG. 2 is a partial cross-sectional view showing the pneumatic control system in an equilibrium condition.

Pneumatic actuator system 22 and pneumatic relay 16 are illustrated in greater detail in FIG. 2. The pneumatic relay shown is a 4000 Series proportional relay sold by Johnson Controls, Inc. and represents only one configuration of many which could be used with pneumatic actuator system 22. Virtually any pneumatic relay using gas flow through a control port to control the amount of gas pressure at an outlet could be used.

As illustrated, gas supply inlet 18 and gas outlet 20 are separated by a valve 34. Valve 34 is disposed in a valve housing 36 and includes a dual diaphragm 37 which includes a first diaphragm layer 38 and a second diaphragm layer 39 that divide the interior of valve housing 36 into a valve chamber 40 on one side of dual diaphragm 37 and a pilot chamber 42 on the other side of diaphragm 37. A pilot circuit 44, including pilot chamber 42, allows a portion of the supply gas to pass through a pilot circuit inlet 46, preferably communicating with gas supply inlet 18. From there, the portion moves through pilot chamber 42 and out a control port 48 to atmosphere. Thus, the position of valve 34 is controlled by the pressure in pilot circuit 44, which varies depending on the amount of restriction placed on gas escaping through control port 48.

Valve 34 includes a valve body 50 against which a spring 52 operates to bias valve body 50 towards pilot chamber 42. A channel 54 extends through the interior of valve body 50 and communicates with an exhaust chamber 56 disposed between diaphragm layers 38 and 39 and communicating with atmosphere. Valve 34 also includes a valve seat 58 towards which a sealing disk 60 is biased by a biasing spring 62. While sealing disk 60 is held against valve seat 58 by spring 62, gas cannot pass between inlet 18 and outlet 20.

Figure 3:
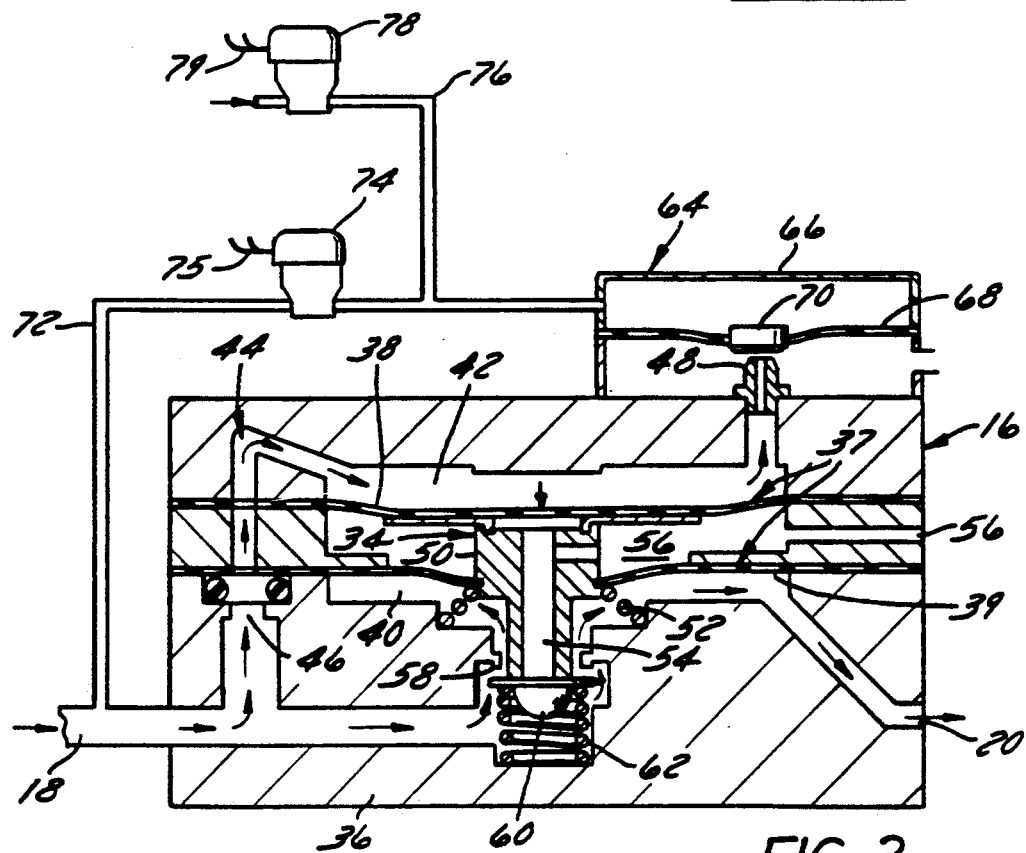
FIG. 3 is a partial cross-sectional view showing the pneumatic control system permitting gas flow between the inlet and the outlet.
Figure 4:
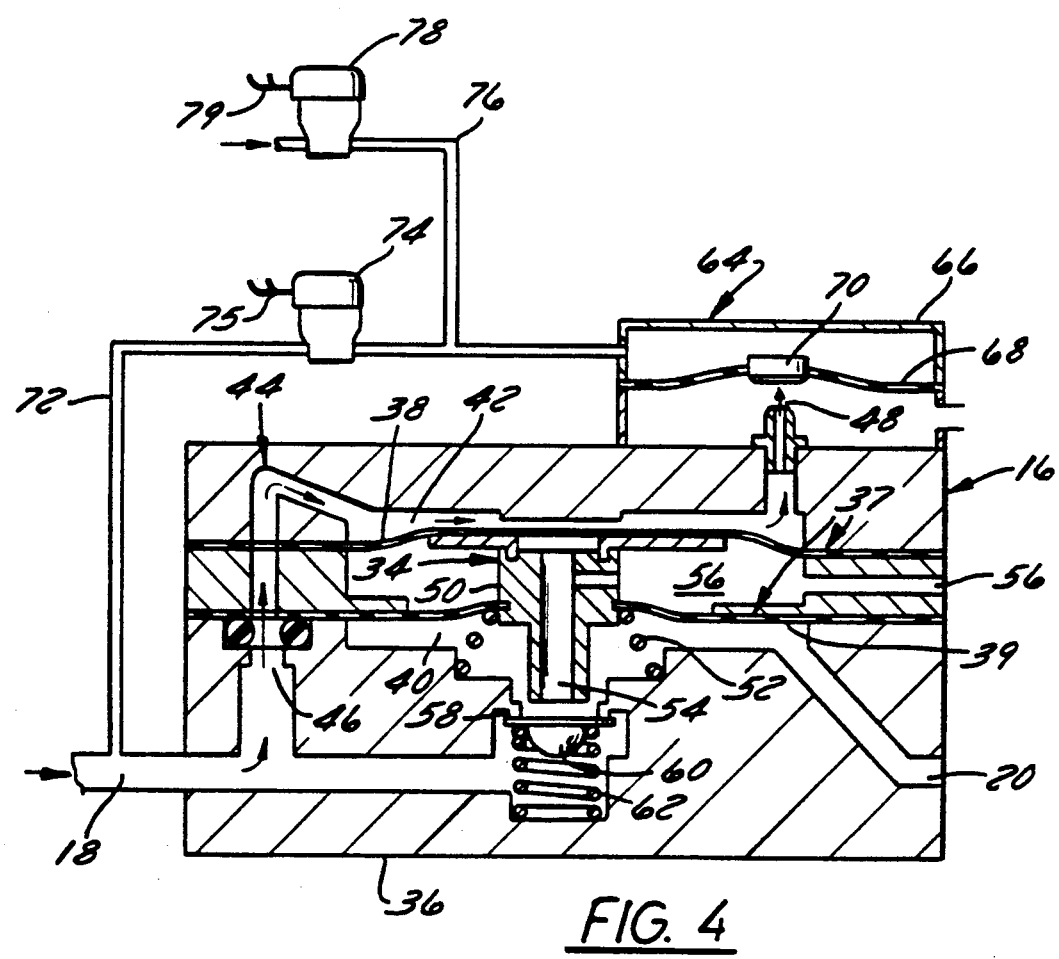
FIG. 4 is a partial cross-sectional view showing the pneumatic control system permitting gas flow between the outlet and the exhaust chamber.

When pneumatic relay 16 is in equilibrium, as shown in FIG. 2, sealing disk 60 is held against valve seat 58 and valve body 50 is held against sealing disk 60 by the pressure in pilot chamber 42. Under such conditions, there is no transfer of gas between either inlet 18 and outlet 20, or between outlet 20 and exhaust chamber 56. However, when the flow of gas through control port 48 is restricted further, the pressure in pilot circuit 44 increases, forcing valve body 50 against sealing disk 60 until it breaks free from valve seat 58 and allows gas to flow between inlet 18 and outlet 20, thereby increasing the pressure acting on controlled device 14 (see FIG. 3). However, if the restriction of gas flowing through control port 48 is lessened beyond the equilibrium condition, then the pressure in pilot circuit 44 will be sufficiently low to allow valve body 50 to move towards pilot chamber 42 under the influence of spring 52, as shown in FIG. 4. Sealing disk 60 is stopped by valve seat 58, but valve body 50 continues to move away from sealing disk 60 until channel 54 is no longer sealed against sealing disk 60. At this point, gas flows from output chamber 20 through channel 54 and out exhaust chamber 56, decreasing the level of pressure acting on controlled device 14. In this manner, the opening and closing of controlled device 14 is regulated by pneumatic actuator system 22, which regulates the amount of gas escaping through control port 48 in response to the control algorithm of digital controller 24. Thus, with the appropriately programmed control algorithm, device 14 may be manipulated according to the output signal of sensor 30 which, in turn, is proportional to the level of the controlled variable acting on sensor 30.

Pneumatic actuator system 22 in combination with digital controller 24 regulate pneumatic relay 16. The pneumatic actuator system 22, as illustrated in FIGS. 2-4, permits control of the substantial air volumes and pressures associated with pneumatic relay 16 without requiring the power that would be necessary to control the volumes and pressures directly by, for instance, solenoid valves. Pneumatic actuator system 22 uses a relatively small amount of the supply gas to regulate the entire pneumatic relay 16.

In the preferred embodiment, pneumatic actuator system 22 includes an inflatable bladder 64 disposed in proximity to control port 48. When bladder 64 is inflated, it restricts air flow from control port 48 and causes an increased pressure in pilot circuit 44 (see FIG. 3). Similarly, when bladder 64 is deflated, gas may move through control port 48 more freely, thus decreasing the pressure in pilot circuit 44 (see FIG. 4). Preferably, inflatable bladder 64 includes a container 66 enclosed on one side by a bladder diaphragm 68 disposed in proximity to control port 48. Bladder diaphragm 68 also incorporates a control port tap 70 configured to provide greater restriction to gas flow through control port 48 as it moves into closer proximity with control port 48.

Bladder 64 is inflated by a portion of the supply gas supplied through a small lead-off conduit 72 connected at one end to bladder 64 and at its other end to the gas supply preferably in proximity to gas supply inlet 18. A gas could be supplied by other methods including separate gas canisters, however, it is more efficient to use a small portion of the gas from pressurized gas supply 12.

An electronic microvalve 74 is connected along conduit 72 for selectively permitting or blocking gas flow to inflatable bladder 64. Microvalve 74 is also connected to digital controller 24 by electrical leads 75 and appropriate interface circuitry (not shown), and is controlled by digital controller 24 in response to the output received from sensor 30. Additionally, an exhaust conduit 76 communicates with conduit 72 between microvalve 74 and inflatable bladder 64. A second electronic microvalve 78 is connected to exhaust conduit 76 to selectively permit the release of gas from inflatable bladder 64. The electronic exhaust microvalve 78 is similarly connected to digital controller 24 by electrical leads 79 and appropriate interface circuitry (not shown), and is controlled by digital controller 24, also in response to the output from sensor 30.

If the controlled variable moves away from the setpoint in a given direction, sensor 30 will provide an appropriate output signal to digital controller 24 which compares the signal to the setpoint and open electronic microvalve 74 to increase the pressure in diaphragm 64. This will move control port tap 70 towards control port 48 to further restrict the flow of gas from control port 48. The resulting increased pressure in pilot circuit 44 will appropriately activate pneumatic relay 16, causing the controlled device 14 to move in a desired direction. Contrariwise, if sensor 30 provides an output causing controller 24 to determine that the controlled variable has varied from the established setpoint in the opposite direction, controller 24 will open exhaust microvalve 78. This will decrease pressure in bladder 64, moving control port tap 70 away from the control port 48, and allowing a greater gas flow through control port 48 lessening the pressure in pilot circuit 44. In this manner, pneumatic relay 16 is actuated in the opposite direction to move controlled device 14 in the opposite direction as that described in the first example.

It should be understood that the foregoing description is of a preferred exemplary embodiment of this invention, and that the invention is not limited to the specific forms shown. For example, various styles and types of pneumatic relays may be used in the controller, various sensors may be used depending on the variable being sensed, various types of electronic microvalves may be used, various configurations and materials may be used in constructing the inflatable bladder, and various internal charging systems may be used. These and other modifications may be made in the design and arrangement of the elements without departing from the scope of the invention as expressed in the appended claims.

The invention claimed is:
1. A pneumatic controller, comprising:
 a sensor product a signal representative of a measured variable;
 a gas supply inlet;
 a gas outlet;
 a pneumatic relay coupled between the inlet and the outlet to regulate a flow of gas passing between the inlet and outlet, the pneumatic relay including a valve and a control port outlet through which a portion of the flow of gas passes, wherein the amount of gas permitted to flow through the control port affects the position of the valve;
 a pneumatic actuator coupled to the pneumatic relay to actuate the pneumatic relay, the pneumatic actu- ator including an inflatable bladder which interacts with the control port outlet to affect the gas flow therethrough; and a control system coupled between the sensor and the pneumatic actuator control the inflatable bladder in response to the signal such that the pneumatic relay regulates the flow of gas.

2. The pneumatic controller of claim 1, wherein the control system includes a digital controller.

3. The pneumatic controller of claim 2, wherein the digital controller is powered by a remote power supply.

4. The pneumatic controller of claim 2, wherein the control system includes a battery connected to the digital controller for powering the digital controller.

5. The pneumatic controller of claim 4, wherein the battery is charged by a solar cell.

6. The pneumatic controller of claim 4, wherein the battery is charged by an air turbine disposed in communication with the inlet.

7. The pneumatic controller of claim 5, wherein the pneumatic relay includes the valve disposed between the inlet and the outlet for controlling the gas pressure at the outlet, and a pilot gas circuit extending between the inlet and the control port outlet, further wherein the level of pressure in the pilot gas circuit regulates the position of the valve.

8. The pneumatic controller of claim 7, wherein the pneumatic actuator includes the inflatable bladder disposed in proximity to the control port, wherein inflation of the bladder restricts gas flow through the control port causing an increased pressure in the pilot gas circuit and deflation of the bladder allows greater gas flow through the control port causing a decreased pressure in the pilot gas circuit.

9. The pneumatic controller of claim 8, wherein inflation and deflation of the bladder is controlled by a pair of electronic microvalves including an inflate valve for controlling gas flow into the bladder and a deflate valve for controlling release of gas from the bladder.

10. The pneumatic controller of claim 9, wherein the inflate valve is connected between the bladder and the inlet of the pneumatic relay.

11. A pneumatic controller comprising:
a gas supply inlet;
a gas outlet;
a pneumatic relay connected between the inlet and the outlet for selectively relaying a pressurized gas, the relay including a valve controlled by an established pressure in a pilot circuit, the pilot circuit having a pilot gas inlet through which a portion of the pressurized gas enters and a control port through which the portion exits, wherein the pressure is regulated by controlling the amount of gas flow through the control port;
an inflatable bladder disposed proximate the control port, wherein inflating the bladder restricts the gas flow through the control port, thus increasing the pressure in the pilot circuit, and deflating the bladder allows increased gas flow through the control port, thus decreasing the pressure in the pilot circuit; and
a regulator system for regulating inflation and deflation of the bladder in response to a controlled variable.

12. The pneumatic controller of claim 11, further comprising a sensor that measures the controlled variable in a controlled space and provides an output to the regulator system proportional to the controlled variable.

13. A pneumatic controller comprising:
a gas supply inlet;
a gas outlet;
a pneumatic relay connected between the inlet and the outlet for selectively relaying a pressurized gas, the relay including a valve controlled by an established pressure in a pilot circuit, the pilot circuit having a pilot gas inlet through which a portion of the pressurized gas enters and a control port through which the portion exits, wherein the pressure is regulated by controlling the amount of gas flow through the control port;
an inflatable bladder disposed proximate the control port, wherein inflating the bladder restricts the gas flow through the control port, thus increasing the pressure in the pilot circuit, and deflating the bladder allows increased gas flow through the control port, thus decreasing the pressure in the pilot circuit; and
a regulator system for regulating inflation and deflation of the bladder in response to a controlled variable;
the pneumatic controller further comprising a sensor that measures the controlled variable in a controlled space and provides an output to the regulator system proportional to the controlled variable, wherein the regulator system includes digital controller operatively connected to the sensor and to an electronic microvalve which controls gas low to the bladder.

14. The pneumatic controller of claim 13, further comprising a conduit connecting the bladder with the gas supply inlet and, wherein the electronic microvalve selectively allows passage of the gas from the gas supply inlet to the bladder.

15. The pneumatic controller of claim 13, further comprising a rechargeable battery configured to power the digital controller and the microvalve.

16. The pneumatic controller of claim 15, further comprising a solar cell connected to the battery to recharge it.

17. The pneumatic controller of claim 16, further comprising a pressure switch disposed in communication with the gas supply inlet and the digital controller, wherein when pressure in the gas supply inlet drops below a predetermined level, the pressure switch prevents the digital controller from modulating the microvalve to conserve stored energy in the battery.

18. A pneumatic controller system, comprising:
sensing means for measuring temperature in a temperature controlled environment and providing an output in proportion to the temperature;
supply means for supplying a gas under pressure;
relay means connected to the supply means for selectively relaying the gas to actuate a controlled device responsive to different levels of pressure, the relay means including an input, an output, an exhaust chamber, and a valve configured to regulate the flow of gas from the inlet to the outlet and from the outlet to the exhaust chamber respectively, wherein the valve is controlled by the pressure level in a pilot circuit, the pilot circuit having a pilot inlet into which a portion of the gas flows and a control port through which the portion exits, further wherein increasing resistance to gas flow from the control port increases the pressure in the pilot circuit;

an inflatable bladder including a control port tap disposed in proximity to the control port, wherein inflation of the bladder moves the control port tap into closer proximity with the control port increasing resistance to gas flow from the control port; and means for regulating inflation of the bladder in response to the sensing means output.

19. The pneumatic controller system of claim 18, wherein the regulating means include an internal power source.

20. The pneumatic controller system of claim 19, wherein the power source comprises a rechargeable battery.

21. The pneumatic controller system of claim 20, further comprising a charger connected to the rechargeable battery.

* * * * *